United States Patent [19]

Teay

[11] Patent Number: 5,158,107
[45] Date of Patent: Oct. 27, 1992

[54] GAS REGULATOR WITH ADJUSTABLE SAFETY DEVICE

[76] Inventor: Jaw-Shiunn Teay, No. 40, Niu-Chou Tzu, Ling-Nan Village, Dung-Shan Hsiang, Tainan Hsien, Taiwan

[21] Appl. No.: 867,402

[22] Filed: Apr. 13, 1992

[51] Int. Cl.$^5$ ............... F16K 17/28; G05D 16/06
[52] U.S. Cl. ............... 137/460; 137/505.46; 137/599; 137/613
[58] Field of Search ............... 137/599, 613, 505.38, 137/505.46, 460

[56] References Cited

U.S. PATENT DOCUMENTS

| | | | |
|---|---|---|---|
| 3,381,707 | 5/1968 | Anderson | 137/460 X |
| 3,742,972 | 7/1973 | Hughes | 137/599 X |
| 3,941,145 | 3/1976 | Morain et al. | 137/460 X |
| 4,257,448 | 3/1981 | Shiu et al. | 137/460 |
| 4,579,142 | 4/1986 | Jung-Chao | 137/460 |
| 4,787,416 | 11/1988 | Chuang | 137/460 X |

*Primary Examiner*—Stephen M. Hepperle

[57] ABSTRACT

A gas regulator with an adjustable safety device has a main body, and two pressure regulators inside the body to regulate the gas pressure inside the body at a stabilized value to flow to a gas stove or the like. The regulator also has a micro adjusting device to stop gas supply in case of large gas flowing such as gas leakage by a steel ball blocking up an end opening in a tube in the micro adjusting device, and the distance between the steel ball and the end opening in the tube can be adjusted to change sensitivity of the ball so as to acquire the best possible safety for gas leakage. A recovery unit is provided to recover the position of the ball from the end opening in the tube if the ball is sucked to block up the end opening in case of gas leakage.

1 Claim, 6 Drawing Sheets

GAS REGULATOR WITH ADJUSTABLE SAFETY DEVICE

BACKGROUND OF THE INVENTION

This invention concerns a gas regulator with an adjustable safety device, which is connected between a gas tank and a gas stove or burner, possible to automatically regulate gas pressure at a stabilized value and also cut off gas supply in case of gas leakage.

SUMMARY OF THE INVENTION

This invention has been devised to have the following features.

1. It has two pressure regulators to regulate the pressure in a chamber in a main body at a stabilized value to be supplied to a gas stove or burner so that two diaphragms in the pressure regulators may have a longer service life and gas volume going out can be kept steady and gas filling time can be comparatively short.

2. It can automatically cut off gas supply in case of gas leakage.

3. A steel ball in a micro adjusting unit included in it can be adjusted in its sensitivity for blocking up gas passage to acquire controlling function for safe gas flowing volume.

The gas regulator with an adjustable safety device in the present invention comprises a body, two pressure regulators, two valve caps, a recovery unit and a micro adjusting unit combined together.

The two regulators combined on and under a pressure regutating base have two diaphragms and two pressure regulating plates. The diaphragms and the plates can swell up and shrink down together in accordance with the gas pressure in a chamber in the body. When the gas pressure becomes comparatively large, the diaphragms and the plates swell up to close up temporarily a gas hole communicating with a gas inlet hole and shrink down to leave off the gas hole if the gas pressure becomes less so that the gas pressure in the chamber can be regulated at a stabilized value. The micro adjusting unit has a steel ball placed in a tube, and the ball can be pushed by a large gas pressure to block up an end opening of the tube to cut off gas supply in case of an irregular occasion such as gas leakage, to acquire automatic safety measure.

The recovery unit has a turning button, which can be manually screwed to make a stem in the recovery unit move inward to push the steel ball off the end opening in the tube to recover the usual gas supply in case of the steel ball automatically cutting off gas supply and screwing the turning button can retreat the stem back outward. The sensitivity of the steel ball against the gas pressure can be adjusted by changing the distance between the steel ball and the end opening of the tube by means of the micro adjusting unit, so as to acquire the best possible safety to cope with gas leakage.

DETAILED DESCRIPTION OF THE INVENTION

Figure 1:
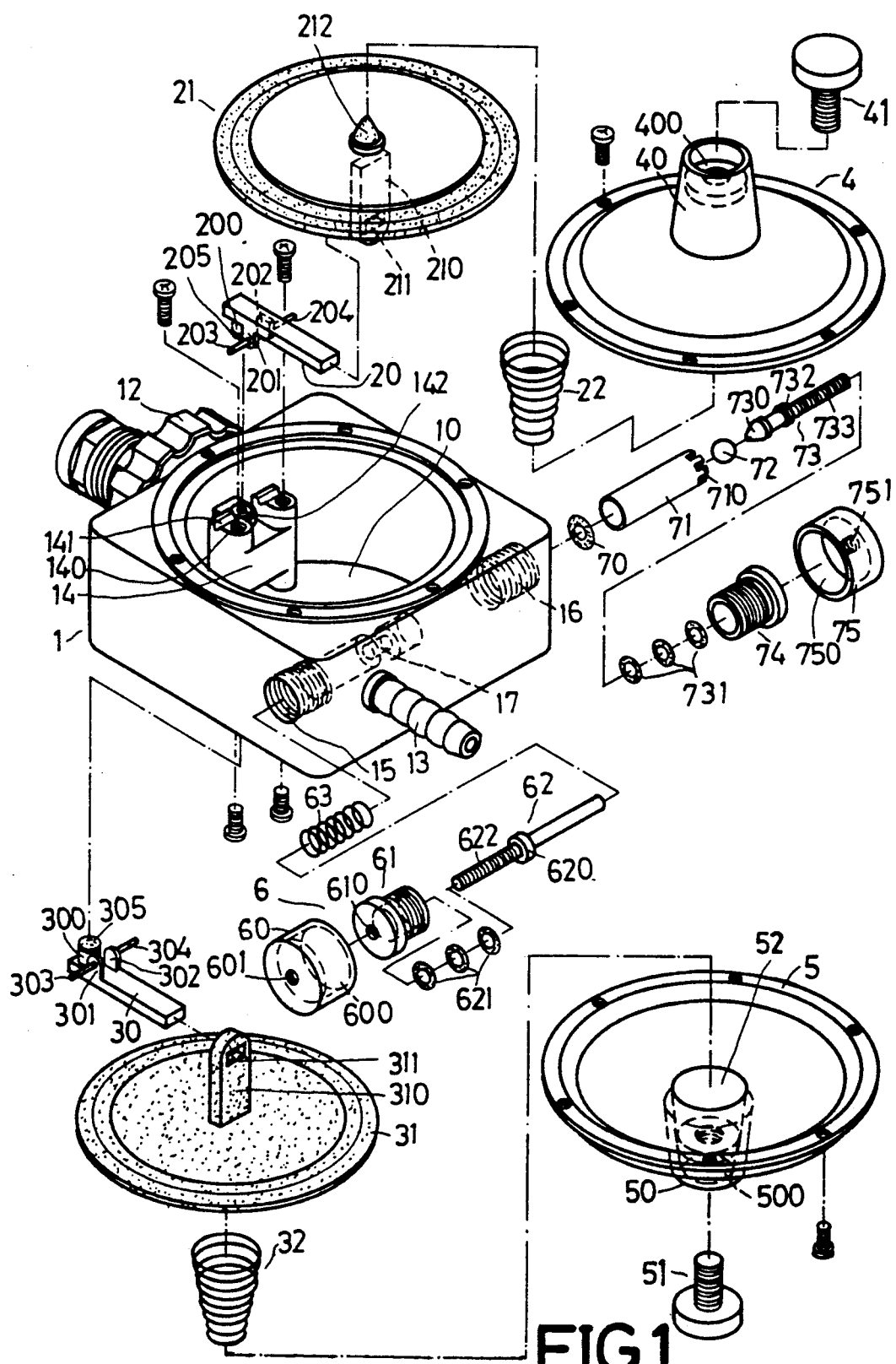
FIG. 1 is an exploded perspective view of the gas regulator with an adjustable safety device in the present invention.
Figure 2:
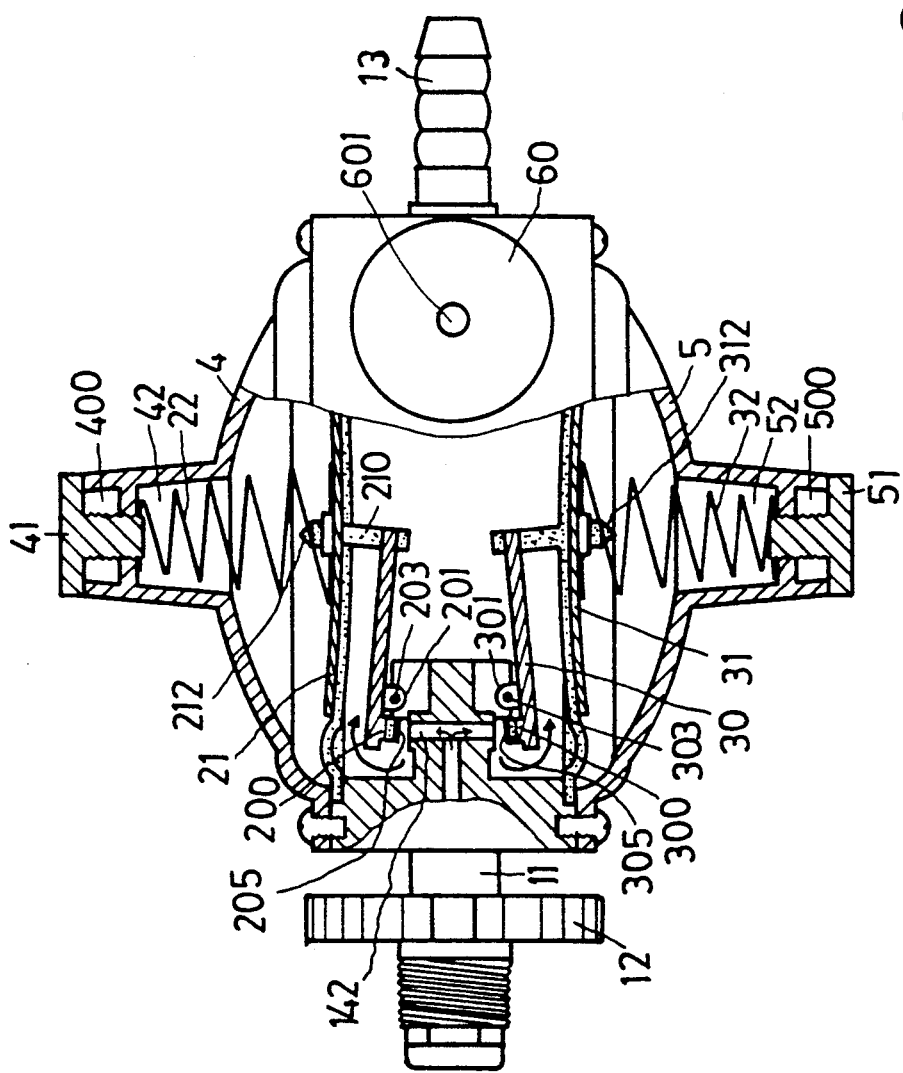
FIG. 2 is a cross-sectional view of the gas regulator with an adjustable safety device in the present invention, which is in assembled condition, with two pressure regulators being under abnormal pressure and with two regulating plates extending outward.

As shown in FIGS. 1 and 2, the gas regulator with an adjustable safety device comprises a main body 1, an inlet tube 11 and an outlet tube 13 oppositely and integrally attached to the main body 1. A chamber 10 is provided in the main body 1, extending vertically with its top and bottom open, and a pressure regulating base 14 is placed in the chamber 10 near the inlet tube 11. The pressure regulating base 14 has several threaded holes 140 in the top and the bottom, a pin groove 141 behind each hole 140, a gas hole 142 behind the pin groove 141 communicating with the inlet hole. The main body 1 also has two opposite nut holes 15, 16 in the right (rear) portion, and the nut hole 15 continues to be formed with a two-stage stem hole 17.

Two pressure regulators 2, 3 are respectively provided on and under the regulating base 14, consisting of two round diaphrams 21, 31, two regulating plates 20, 30, and two coil springs 22, 32. The regulating plates 20, 30 are flat and rectangular, having two round downward projections 200, 300 near their left end, two pairs of engaging projections 201, 202, 301, 302 near the projections 200, 300. Two pairs of pins 203, 204, 303, 304 are fixed sidewise on the engaging projections 201, 202, 301, 302 and stoppers 205, 305 adhered on the projections 200, 300. Two pulling blocks 210, 310 are provided to connect with the regulating plates 20, 30, having connecting holes 211, 311 for one ends of the plates 20, 30 to engage therein. The diaphragms 21, 31 have projecting cones 212, 312 at the center of the upper surface and two caps 4, 5 are provided to cover and be screwed on and under the body 1, having a conical cap posts 40, 50 bored with threaded holes 400, 500 for bolts 41, 51 to screw with. The cap posts 40, 50 are also bored with spring holes 42, 52 for the springs 22, 32 to fit therein.

A recovery unit 16 is provided in the front portion of the body 1, consisting of a turning button 60, a nut 61, a stem 62 and a coil spring 63. The turning button 60 has an inner cavity 600 for mounting the nut 61 therein, and through holes 601, 610 are provided in the button 60 and the nut 61 for the stem 62 to extend therein. The stem 62 has a stop ridge 620 at the intermediate portion, several anti-leak packing rings 621 around a front threaded portion 622 and a coil spring 63 being sleeved around the rear portion.

A micro adjusting unit 7 is provided in the rear portion of the body 1, consisting of an anti-leak packing ring 70, a tube 71, a steel ball 72, a stem 73, a nut 74 and a micro adjusting button 75. The anti-leak packing ring 70, the tube 71 and the steel ball 72 are in order mounted between a nut hole 16 and a stem hole 17 provided in the rear portion of the body 1. The tube 71 has a number of air holes 710. The micro adjusting button 75 has an inner cavity 750 for the nut 74 to fit in, and a central through hole 751 to communicate with a central through hole 740 in the nut 74. The stem 73 is mounted in the through holes 740 and 751, projecting in the tube 71, and having the conical front end 730, several anti-leak packing rings 731 around the rear threaded portion 733 and a stop ridge 732 at the beginning of the threaded protion 733. The nut 74 screws with the nut hole 16.

Figure 3:
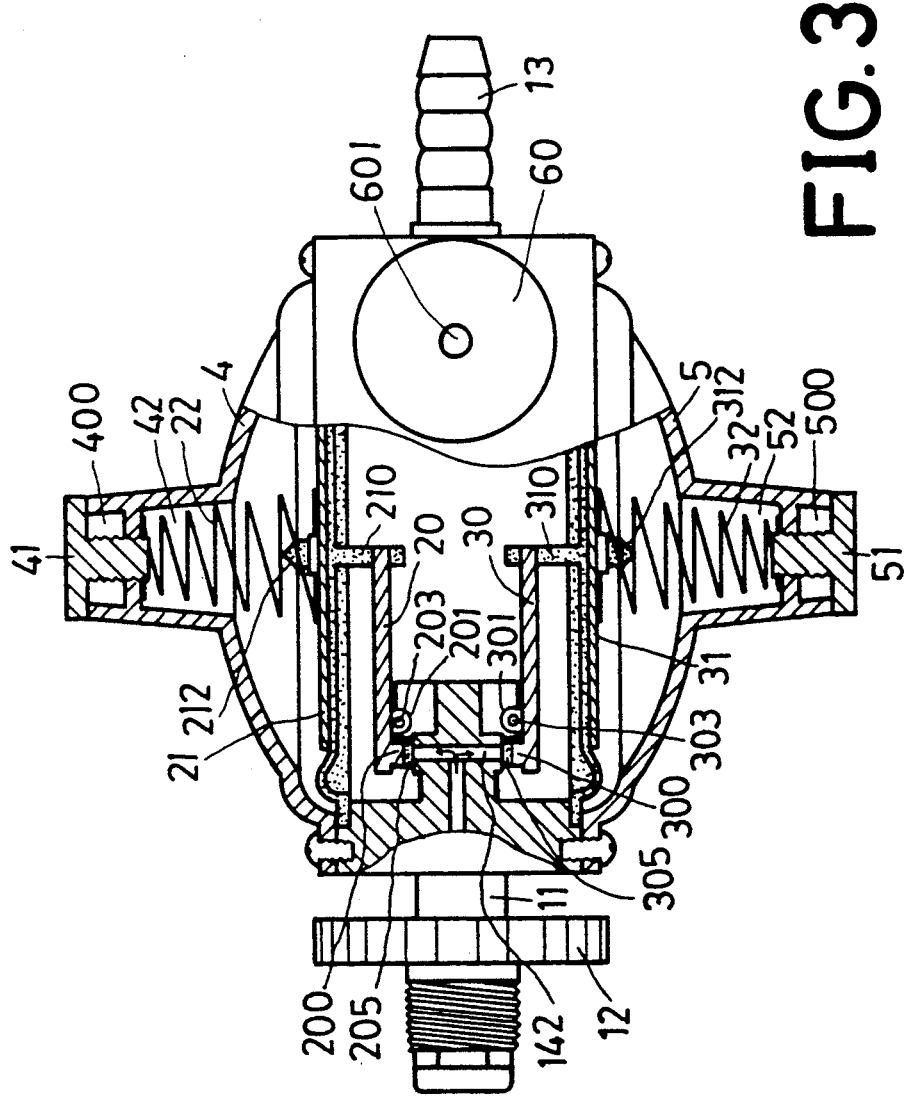
FIG. 3 is a cross-sectional view of the gas regulator with an adjustable safety device in the present invention, which is in assembled condition, with the pressure regulators being under normal pressure and with the regulating plates in flat condition.
Figure 4:
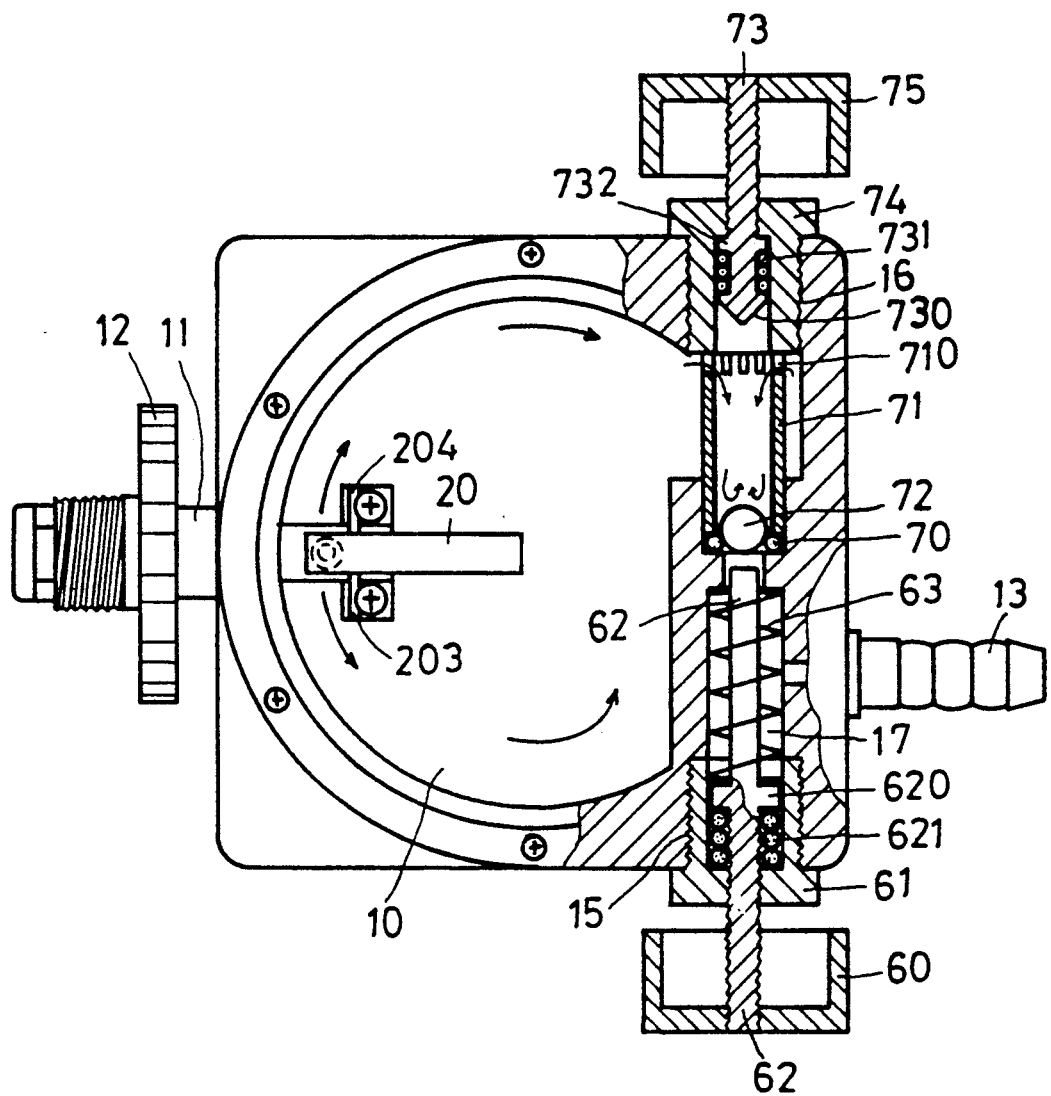
FIG. 4 is a cross-sectional view of a steel ball pressed forward to close up an end opening in a round tube in a micro adjusting unit in the gas regulator with an adjustable safety device in the present invention in case of gas leakage.

After this gas regulator has been wholly assembled for use, and if the gas in a gas tank flowing through the connecting tube 11, a gas hole 142 and into the chamber 10 is in high pressure condition or flows out in a large volume, the chamber 10 can be filled up with flowing gas, forcing the regulating plates 20, 30 to move outward and thus the diaphrams 21, 31 also to swell outward compressing the springs 22, 32, as shown in FIG. 2. When the regulating plates 20, 30 have moved to become horizontal, the stoppers 205, 305 can close up the gas hole 142 as shown in FIG. 3 so that the pressure within the chamber 10 may be kept at a stabilized value. After the gas in the chamber 10 has flown out, the springs 22, 32 so far compressed will recover elasticity to push back the disphragms 21, 31 and the regulating plates 20, 30, forcing the stoppers 205, 305 to separate from the gas hole 142 as shown in FIG. 2. Then the chamber 10 can be refilled with gas swiftly, and the steel ball can be prevented from blocking up the tube 71 to cut off gas flow completely caused by large pressure difference. And the diaphragms 21, 31 can have longer service life.

In case the gas stove or burner connected with the outlet tube 13 should have broken or gotten out of order, flowing speed of gas at the leaking side (or the connecting tube 13) will become faster than the inlet side (or the connecting tube 11), and the pressure in the chamber 10 will become bigger than the leaking side, breaking the original pressure balance and giving rise to a pressure difference. Then the steel ball 72 in the tube 71 can be pushed to and block up the front end opening of the tube 71, automatically cut off gas supply, to resultant safety.

Figure 5:
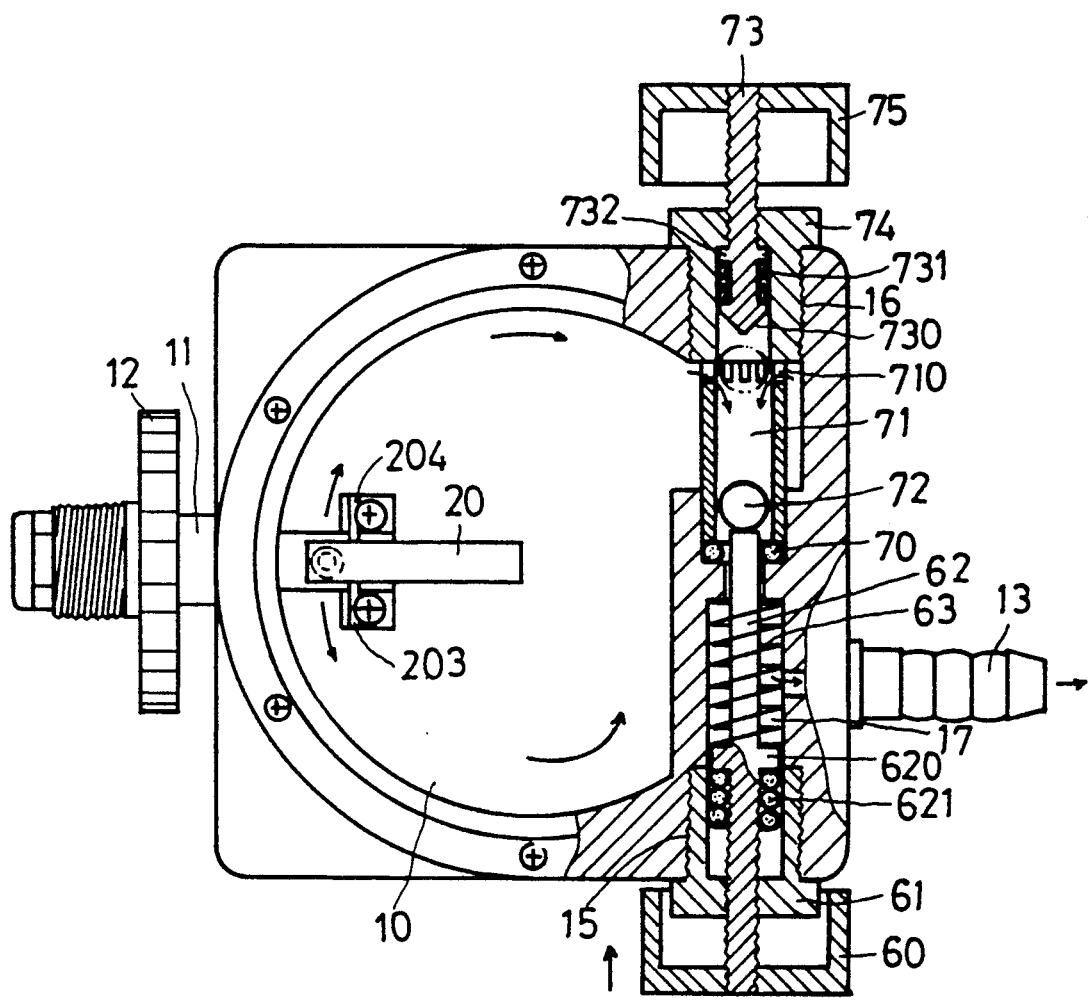
FIG. 5 is an actional cross-sectional view of a recovery unit in the gas regulator with an adjustable safety device in the present invention.

After the gas supply has been cut off by the steel ball 72, it can be restored by screwing rearward the turning button 60 in the recovery unit 6 to retreat rearward the stem 62 so as to push the steel ball 72 to leave off the front end opening of the tube 71 as shown in FIG. 5. Then gas can be supplied again as usual, and the turning button 60 can be screwed back outward to pull the stem 62 out of the tube 71.

Figure 6:
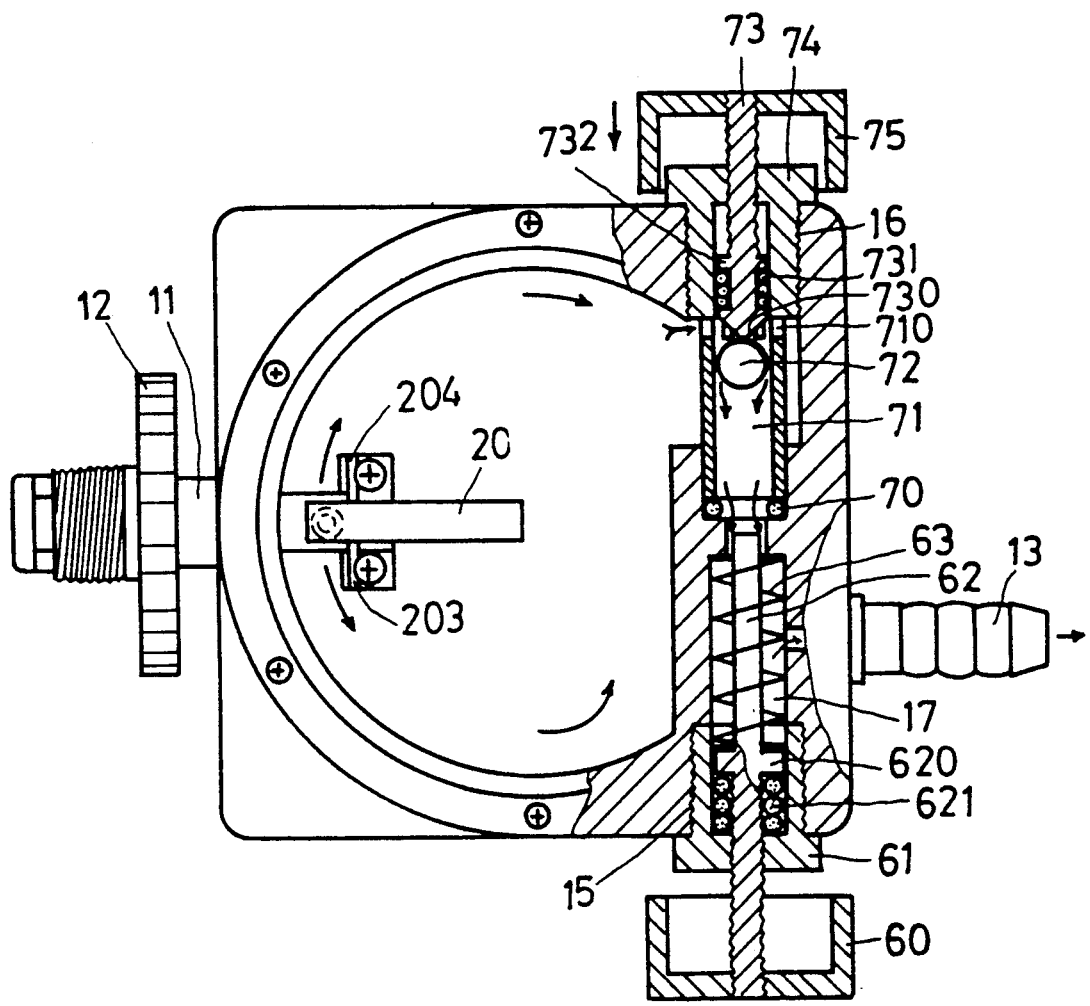
FIG. 6 is an actional cross-sectional view of a micro adjusting unit in the gas regulator with an adjustable safety device in the present invention.

The micro adjusting unit 7 is used to adjust the sensitivity of the steel ball 72 to acquire the best possible safety to cut off gas supply in case of gas leakage. The adjusting button 75 is screwed inward and outward, moving inward and outward the stem 73, which then pushes the steel ball 72 to adjust the distance between the ball 72 and the end opening of the tube 71. If the distance between them is adjusted short, the ball 72 can be absorbed to block up the end opening of the tube 71 even if the pressure in the chamber 10 is small as shown in FIG. 6. But if the distance between them is adjusted long, the ball 72 needs to be pushed to block up the end opening of the tube 71 by a larger pressure in the chamber 10.

What is claimed is:

1. A gas regulator with an adjustable safety device comprising:

a main body having an inner cavity opened to the top and the bottom, a connecting tube connected with an inlet hole bored in the left side of the body, a turning disc fixed with the connecting tube, a gas outlet tube connected with the right side, a pressure regulating base near the inlet hole in the cavity, several upright threaded holes provided in the top and the bottom of the pressure regulating base, a horizontal pin groove behind the upright threaded holes, a gas hole communicating with the inlet hole behind the pin groove, a pair of horizontal threaded holes in the right portion communicating with each other, and the front threaded hole provided with a two-stage stem hole;

two pressure regulators respectively mounted on the top and the bottom of the pressure regulating base in the cavity, consisting of two regulating plates, two diaphragms and two coil springs, said regulating plates having two round projections, two pairs of inserting projections, a sidewise projecting pin fixed with each said inserting projections, said round projections adhered on with a stopper, a pull block provided to stand upright in the center of each said diaphragm and having a connect hole at the end for one ends of said regulating plates to fit with, a cone attached on the top surface of each said diaphragm, and a coil spring surrounding each said cone;

two valve caps being screwed on the top and under the bottom of said main body, respectively having a cap post on the top and under the bottom, a threaded hole in the top of each said cap post for a bolt to screw with, a spring hole in each said cap post for mounting said coil spring on the top and under the bottom of the diaphrams;

a recovery unit mounted in the front portion of said main body, consisting of a turning button, a nut, a stem and a coil spring, said turning button having a cavity for the nut to fit therein and a central through hole, said nut having a central through hole, said stem being mounted to extend through the central through hole in said turning button and said nut and having a stop ridge at the intermediate portion, a threaded front portion, several anti-leak packing rings placed around the threaded front portion and the rear portion being sleeved around with a coil spring;

a micro adjusting unit being mounted in the rear portion of said main body, consisting of an anti-leak packing ring, a tube, a nut and an adjusting button, said anti-leak packing ring, said tube and said steel ball being placed in order between the nut hole and the stem hole in the rear portion in said main body, said tube provided with a plurality of air holes, said adjusting button having an inner cavity for fitting in said nut, said adjusting button and said nut provided with a central through hole for said stem to extend through to protruding in said tube, said stem having a conical front end, several anti-leak packing rings around the portion abutting the conical front end, a stop ridge behind the anti-leak packing rings and a threaded rear portion to screw with the nut hole in the rear portion of said main body; and said two diaphragms in the pressure regulators being possible to swell and shrink by the pressure in said chamber in said body and thus said two regulating plates being pushed to move to block up or leave off the gas hole communicating with the gas inlet hole in said main body so that the pressure in said chamber in said main body may be swiftly regulated and gas supply time may be shortened to make gas to flow smoothly out of said chamber, said steel ball in said micro adjusting unit being possible to be sucked inward to block up the front end opening in the tube in said micro adjusting unit to automatically cut off the gas for safety in case of a large gas pressure caused by gas leakage or the like, said turning button in said recovery unit being screwed to retreat said stem in said recovery unit to push said steel ball off the front end opening in the tube in said micro adjusting unit for recovering usual gas supply in case of said steel ball cutting off the gas supply, said adjusting button in said micro adjusting unit being screwed outward and inward to move outward and inward the stem, which then pushes said steel ball inward and outward, changing the distance between said steel ball and the front end opening of said tube so that sensitivity of said steel ball against the gas pressure within said chamber may be regulated to a desired value to acquire the best possible safety to cope with gas leakage.

* * * * *